R. D. McCREERY.
ELECTRICALLY CONTROLLED ANIMAL POWER.
APPLICATION FILED JULY 16, 1914.
1,121,855.
Patented Dec. 22, 1914.
2 SHEETS—SHEET 2.
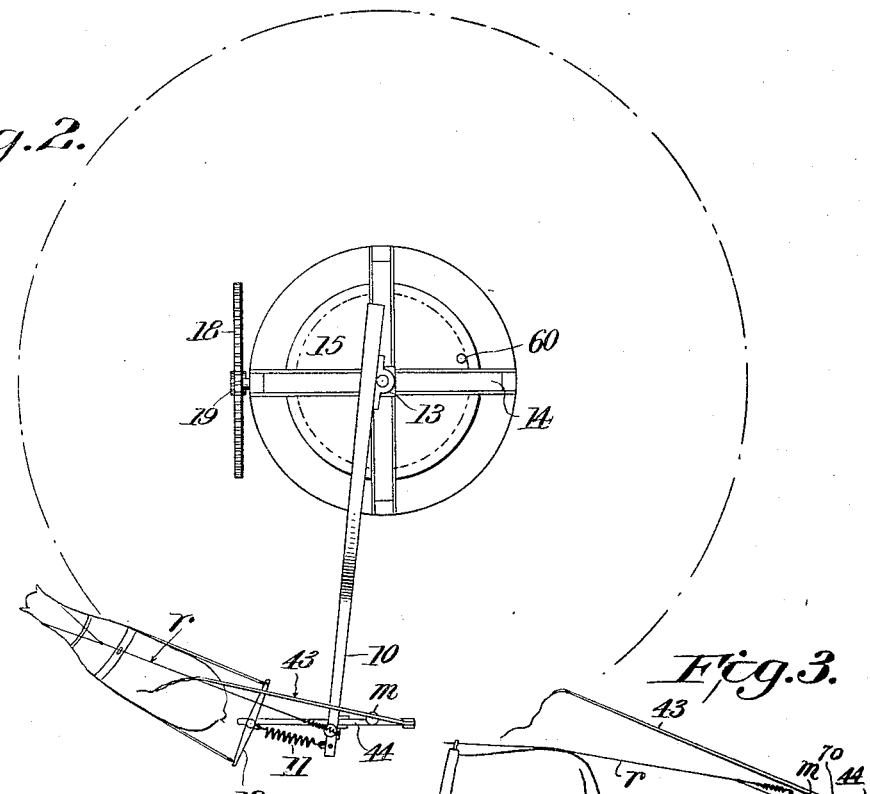
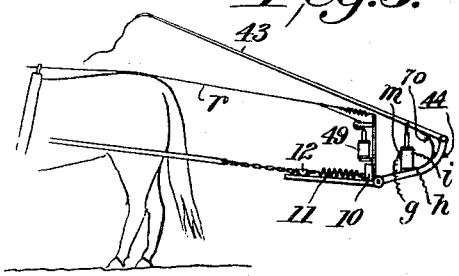
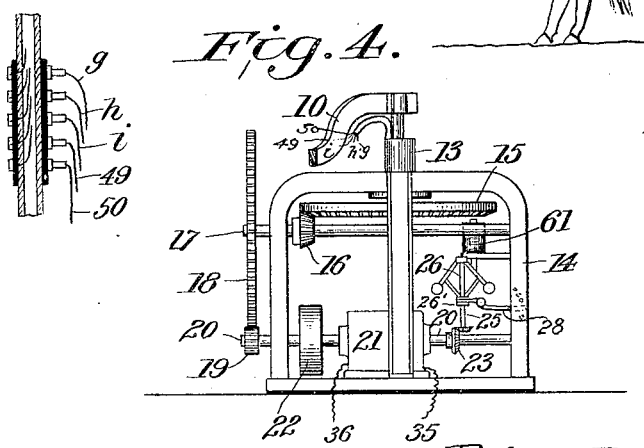
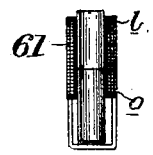
Witnesses
C. M. Walker.
G. Manning.
Inventor
Robert D. McCreery
By T. Walter Fowler
Attorney

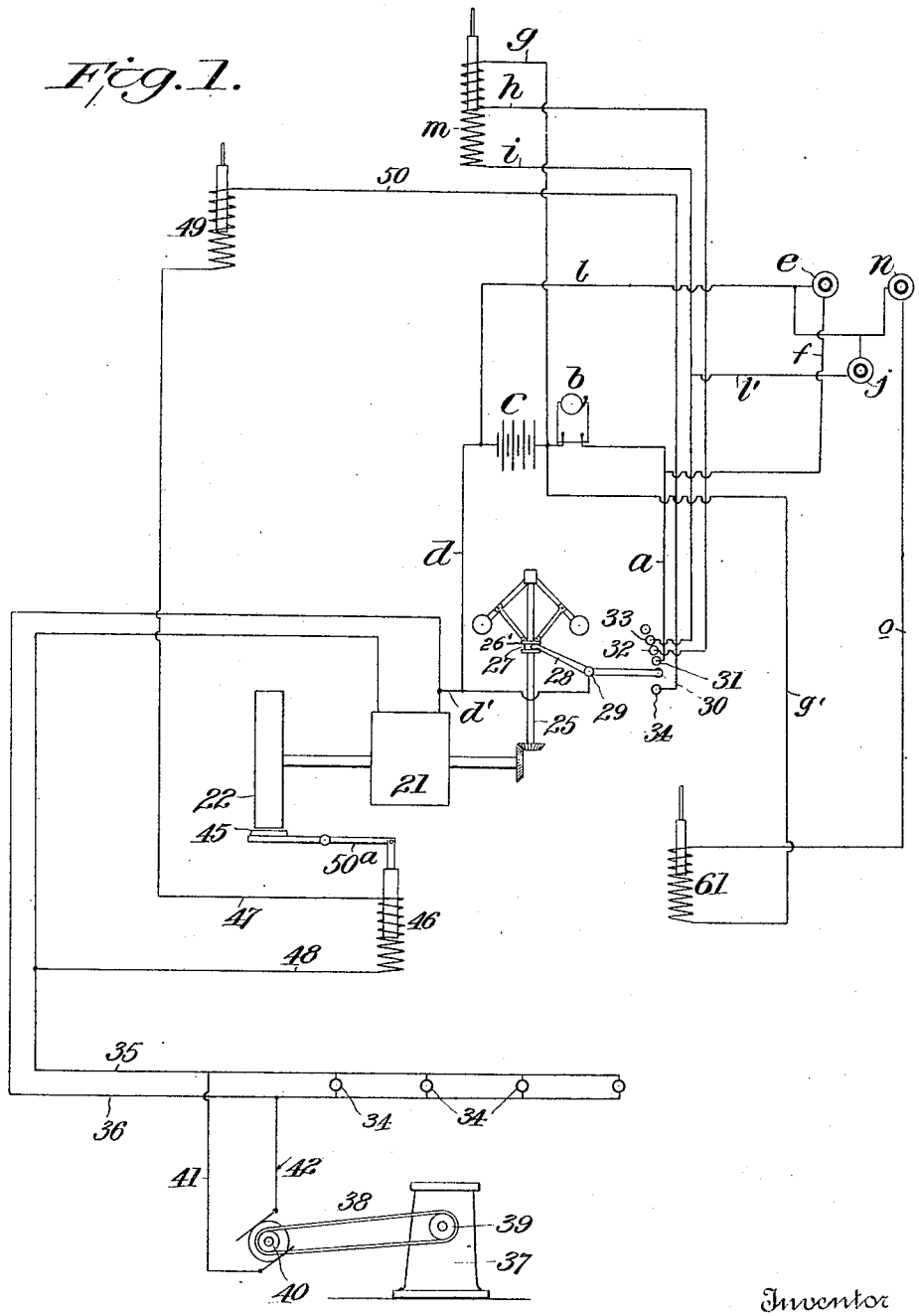

UNITED STATES PATENT OFFICE.

ROBERT D. McCREERY, OF ROCHESTER, NEW YORK.

ELECTRICALLY-CONTROLLED ANIMAL POWER.

1,121,855.  Specification of Letters Patent.  Patented Dec. 22, 1914.

Application filed July 16, 1914. Serial No. 851,308.

*To all whom it may concern:*

Be it known that I, ROBERT D. McCREERY, a citizen of the United States, residing at Rochester, in the county of Monroe and State of New York, have invented certain new and useful Improvements in Electrically-Controlled Animal Power, of which the following is a specification.

My invention relates to a new and useful electric system for the speed regulation and control of the tractive pull of animals, and the invention consists of the constructions, arrangements and combinations of devices substantially as hereinafter described and claimed.

The leading object of my invention is to electrically control the movements of an animal, as a horse, so as to produce an electric current having practically a constant voltage and which current is utilized whenever desired for heating, lighting, power and storage purposes; for instance, the system hereinafter described will be found practical and useful on farms and particularly in locations where fuel may be scarce, or wherein the tractive power of a draft animal, as a horse, may be utilized for operating a generator, and wherein the movements of the horse are automatically controlled and his speed regulated through the medium of suitable circuit closers arranged in circuit with appliances for whipping the horse if his speed falls below the minimum, or that required for the desired purpose, and for checking or entirely stopping the travel of the horse.

In the accompanying drawings I have illustrated one embodiment of my invention, but it will be understood that I do not limit the invention to the specific devices and arrangement of parts shown but that the invention comprehends and includes any and all equivalent arrangements wherein the tractive pull of the horse may be utilized and the movements of the horse electrically controlled.

In said drawings Figure 1 is a diagram showing a general arrangement of the several parts and a means for controlling the movements of the animal, and showing a system of lights and a farm appliance arranged in circuit. Fig. 2 is a plan view of a horse power of the sweep-type with a whipping attachment carried thereby. Fig. 3 is a side elevation of the whipping attachment. Fig. 4 is an elevation of a horse power suitable for my purpose. Fig. 5 is a detail showing in section a portion of the shaft, 13, with conductors arranged thereon for conveying electric current to the whipping and checking mechanisms. Fig. 6 is a detail to be referred to.

In Figs. 2 and 4, I show one embodiment of a horse power of suitable construction having a sweep, 10, to which the animal is attached, say by a flexible or elastic connection, 11, connecting the outer end of the sweep to the swingletree, 12, to which the traces are attached in any suitable manner. The inner end of the sweep is appropriately connected to a shaft, 13, mounted in a suitable frame or casing, 14, and carrying a master-gear, 15, of large diameter which is in mesh with a ratchet pinion, 16, on a stub-shaft, 17, mounted in said frame or casing and having fixedly secured to it a large gear wheel, 18, which is in mesh with a small pinion, 19, on a horizontal shaft, 20, of any well known and appropriate type of electric generator, 21, said shaft, 20, being supplied with a fly-wheel, 22, and being provided, also, with a beveled gear, 23, which is in mesh with a similar gear, 24, on the vertical shaft, 25, of an appropriate centrifugal or other governor, 26, the sliding sleeve, 26', of which is embraced by the end of a lever, 28, pivoted at 29 and having its opposite end provided with a contact, 30, which is adapted to operate over suitable contacts, 31, 32, 33 and 34, each of which is in circuit with suitable controlling devices, as I will now describe.

In Fig. 1, the lever, 28, is shown in mid position and which position represents the normal position of the lever when the governor is operating at the desired speed and accordingly, when the animal is traveling at a practically uniform rate. If the speed of the animal falls below the normal, the governor balls will drop in the manner well known for centrifugal governors and the collar, 27, will move downwardly on the shaft, 25, and thus rock the lever, 28, about its pivotal center, 29, and move the contact end of the lever onto one or the other of the contacts, 31, 32 and 33; if the speed of the governor becomes excessive, the arms carrying the balls tend to straighten out and this results in the collar, 27, moving upwardly on the shaft and pulling with it the lever, 28, thereby causing the lever to be rocked about its pivotal connection to carry the contact end of the lever onto an appropriate contact, 34, which is in circuit with devices for checking the movement of the horse, as by applying a brake or equivalent to the horse power and thus retarding the operation of the generator; at the same time exerting a pull on a check rein connected to the horse's bit. To make these operations better understood, it will be observed that the contact, 31, is connected to a wire, *a*, leading to one side of a bell or signal, *b*, the other side of the bell being connected to a battery, *c*, from which leads a wire, *d*, to the lever, 28, and thence through the contacts 30 and 31, thereby completing the circuit. The bell, *b*, and battery *c* are also included in a manually-operated circuit which comprises a wire, *l*, leading from the battery to an appropriate push-button, or circuit closer, *e*, from which latter a wire, *f*, leads to one side of the bell, said bell having its opposite side suitably connected by a wire to the battery. From this latter arrangement it will be understood that to start the horse-power the operator will depress the push-button, *e*, to close the circuit and the current will flow from the battery to the push button and from thence to the bell or signal and thus give an audible alarm.

It will be understood that in the operation of my system, the horse or other animal will be trained to respond to the alarm given in much the same manner that the horses in the fire departments of modern cities respond to the gong sounded in the fire houses, and that upon the signal being given, the animal will at once start in motion and thus operate the sweep and through the gearing before described, multiply the speed to such an extent that an electric current is generated in the generator, 21, and this current may be utilized for the lighting of the house and to this end the lamps, 34, are in circuit with suitable wires, 35, 36, suitably connected to the generator. The lighting of the house is, therefore, made possible by the horse power and this is under the control of an occupant of the house who is only required to operate the push-button or circuit closer and thus give the audible signal which is responded to by the animal and the light is continued as long as the horse power is in motion. This phase of my invention is made quite possible because of the discovery and now extensive use of the tungsten lamp, which allows of a fluctuation range of about 30 volts in 110 volt lamps without serious injury either to the lamp or candle power. I maintain, however, that in the choice of a suitable horse, a speed regulation may be obtained of approximately 5%, which is equal to a gas or gasolene engine prime mover. If the electric current is desired for the operation of a farm implement, say a churn, hay cutter, washing machine, crusher, or like machine, it may be communicated to the latter through an appropriate means. For instance, in Fig. 1, I show a churn, 37, which may be of the barrel type, which is driven by a belt, 38, passing over a pulley, 39, and actuated by a motor, 40, to which current is supplied from the wires, 35 and 36, through other wires, 41 and 42.

Means are employed for hastening the movements of the horse should he not suitably respond to the signal given on the bell, *b*, when the starting push button, *e*, is actuated. These means may be varied in character, but preferably shall include an electrically operated whip, 43, arranged in suitable relation to the horse, and pivotally connected at its butt end to a frame, or support, 44, which may be suitably secured and carried by the sweep, 10, of the horse power, said support carrying an electromagnet or solenoid, 45, the core of which is suitably connected to the whip at a point forward of the pivot thereof, and said solenoid being connected to wires, *g*, *h*, *i*, which are in circuit with the push button, or circuit closer *j*. Thus, if the horse is moving too slow, or fails to respond to the signal given on the bell upon the actuation of the push button, *e*, the operator in the house will press the push button, *j*, and the circuit will be completed and current will flow from the battery, *c*, through wires, *l*, and circuit closer, *j*, and wires, *i* and *l'*, through solenoid wire, *m*, wire, *g*, thence back to battery, *c*. The core of the solenoid is thus drawn into its coil and this will cause the whip to descend upon the horse striking a smart blow with the result that his speed will be increased to the desired extent, and which may be determined by the lighting of the lamps in the house or the running of the particular machine which it is desired to operate. An intelligent horse will soon learn to avoid the whipping and consequently will respond to the first audible alarm given on the bell, therefore, it may not be necessary to use the whipping apparatus.

As the generator is started in motion by the horse power the governor is at once actuated and its speed of rotation determines the position of the lever, 28, to the respective contacts, 31, 32, 33, and 34 and after the machine is in operation the governor controls the various circuits independent of the push button or circuit closers before mentioned. For instance, if the speed of the governor is such that the lever, 28, is held in the mid-position shown in Fig. 2, the horse power is then operating at the desired speed and current is being generated for domestic or other purposes, but if the speed of the governor decreases to such an extent that the amount of power generated is not sufficient for the purpose, the collar, 27, of the governor slides downwardly on its shaft and the lever, 28, is rocked to carry its contact, 30, upon the contact, 31, when current will flow from battery, c, through wires a, and d and bell and thus ring the bell which is supposed to be notice to the horse that his movement must be quickened and a properly trained horse will respond at once to the signal thus given. As the speed of the horse increases, the rotation of the governor correspondingly increases and the collar of the governor moves upwardly on its shaft and thus rocks the lever back to its mid-position. If the horse does not respond to the signal and the collar of the governor continues to slide downwardly on its shaft, the lever, 28, is rocked sufficiently to carry its contact, 30, onto the contact, 32, thus completing a circuit through the wires, g and h, contacts, 32 and 30, lever, 28, wire d, to battery c, thereby actuating the solenoid core, m, and lightly actuating the whipping appliance; if for any reason the horse should not respond to the light impulse given the whipping appliance, and the collar, 27, continues to descend on the shaft of the governor, the lever, 28, is further rocked to carry its contact, 30, onto the contact, 33, in which case the circuit is completed through the wires, g, i, contacts, 33 and 30, lever, 28, wire d, and battery, c, and the whole strength of the solenoid, m, is thus communicated to the whipping appliance, 43, and a sufficiently strong blow is given the horse to cause him to quicken his movements and when this is accomplished and the speed of the governor is accelerated, the lever, 28, will be returned to mid-position and remain so until the speed falls below that desired for the generation of the necessary power.

If at any time the horse should travel at too rapid a speed or the tractive pull of the horse should be too great, or there should be a tendency for the horse to run away, his movements will be checked instantly by the application of a brake, 45, to the fly-wheel, 22, on the generator shaft, and which brake is actuated by a solenoid or its equivalent electro-magnet, 46, which is suitably connected to wires, 47 and 48, one of which, 48, is connected to a main line wire, 35, and the other, 47, is connected to a solenoid, 49, or equivalent electro-magnet, which latter, through a wire, 50, is connected to a suitable contact, 34. Thus, if the horse should travel too fast, or should attempt to run away, the speed of the governor is increased and current will flow from the main generator wire, 35, through wire, 48, solenoid, 46, solenoid, 49, wire, 47, to solenoid, 49, and thence over wire, 50, through contacts, 34 and 30, lever, 28, wire, d, branch, d', to generator wire, 36.

Upon the core of the solenoid, 46, being energized, a lever, 50ª, connected thereto will be rocked and the brake, 45 will be applied to the fly-wheel, 22, of the generator, thus retarding the rotation of the generator and automatically checking the movement of the horse.

In order that the matter of control of the animal which actuates the horse power may be fully understood, and to make this part of my invention perfectly clear, I will assume that the horse has stopped and the machine is idle, and that it is desired to generate power for the lighting of the house, or for operating some machine or implement. When this is desired, an operator in the house closes the circuit by pushing the button, e, and this causes an alarm to be sounded on the bell or other signal. Because of his intelligence and proper training, the horse is supposed to start upon hearing the signal, but if he does not respond to the signal and this fact is made known by the failure of the power to appear, which may be evidenced by the lack of light, or failure of the machine to run, the operator will push the button, j, a few times, which closes the circuit, containing the solenoid, m, and causes this solenoid to operate its core and impart the desired movement to the whipping device, 43. As the animal is attached to the sweep arm, 10, it is apparent that when he starts in motion the generator is actuated through the horse power mechanism and when the horse attains the desired speed, an electric current is generated and is sent out over the main line, 35—36, thus illuminating the lamps in this circuit, or the power may be taken from this line for operating the churn or other machine or implement. When sufficient speed has been obtained to cause the generation of an electric current, the governor will operate to move the lever, 28, so that the contact point thereof will rest in the neutral position as shown in Fig. 1, and the lever will maintain this position so long as the travel of the horse remains substantially constant, but if the horse slackens his speed, the speed of the governor is correspondingly lowered and the governor balls fall and by so doing and through the connection of the lever, 28, with the governor, said lever is rocked about its pivotal connection, to cause its contact to ride onto the contact, 32, which closes the circuit in which the whipping device and actuating solenoid, 45, are included, with the result that the whip is applied to the horse for the purpose of causing the horse to quicken his speed. If the horse does not respond to the whipping, the governor further actuates the lever, causing its contact, 30, to ride onto the contact, 33, in the circuit which includes the solenoid whipping device and the full strength of the solenoid, m, is now transmitted to the whipping device and the animal is given smart blows. If the speed of the horse becomes excessive, the governor balls are moved outwardly by centrifugal force, and the lever, 28, is rocked in the opposite direction to cause its contact to ride onto the contact, 34, thereby completing a circuit through the wires, 50, 48, 47, *d, d'* and solenoids, 46 and 49, which solenoids are in series with each other and are energized by the current from the generator, 21, direct. In this circuit is located the solenoid, 49, or its equivalent electromagnet, suitably supported on the sweep of the horse power and having its core appropriately connected to the check rein, *r*, of an appropriate harness, with which the animal is supplied. Accordingly, when the solenoid, 49, is energized, through the closing of the last-mentioned circuit, the core of the solenoid pulls upon the check rein, and this tends to reduce the speed of the animal. At the same time, the solenoid, 46, is energized and actuates the lever, $50^a$, which forcibly moves the friction shoe, 45, against the rim of the fly-wheel, 22, and reduces or entirely stops the rotation of the generator. It is thus seen that the application of power to the check rein and the retarding of the rotation of the generator are produced simultaneously and a forcible resistance is now offered to the animal for the purpose of checking his speed and reducing the speed to normal.

The master wheel, 15, of the horse power is provided with a hole, 60, and the core of a solenoid, 61, and which solenoid is in a circuit which includes the push button, *n*, and wires *l, g'*, and *o*, is designed to enter the hole, 60, and when the operator desires to stop the travel of the horse, he will close this circuit by operating the push button, *n*, and this energizes the solenoid, whose core is designed to pull upwardly (Fig. 6), so that it will enter the hole in the master wheel, when the latter comes into register with the said core. The master wheel is thus temporarily locked against further movement and remains in a locked position until again released by the operator removing the pressure from the push button. On account of the momentum of the generator and fly-wheel, the pinion, 16, I prefer to make as a ratchet pinion, as this allows the balance of the machinery to slip and to come to rest gradually.

The arrangement of the whipping features is such that the relation of the whip, 43, to the animal does not change if the animal is in a recumbent position. To this end, the whip, 43, is pivoted to a support, 43', pivotally attached to the sweep-arm, 10, and having an extension upon which is supported the swingle-tree, 12, said whip being held in its outward or raised position by a spring, 70. As the support, 43', is pivotally mounted it is evident that if the horse lies down the weight of the swingle-tree will cause the support to tilt about its pivot and thereby lower the whip in unison with the lowered position of the animal to thereby maintain a relative position between the animal and whip under all circumstances. The conductor wires, *g, h, i*, 49 and 50, before mentioned may be disposed in any desired manner. In Fig. 5, I show each of these wires as leading to a brush, *s*, which contacts with an appropriate commutation ring, *t*, surrounding and properly insulated from the shaft 13, which shaft is hollow and has upon its interior wires, *u*, corresponding to the wires, *g, h, i*, 49 and 50, and leading out at the top of the shaft, and along the sweep 10, to the proper electrical current with which it is connected.

From the foregoing description it will be understood that my invention comprehends a means for automatically controlling the movements of a power mechanism operated by one or more horses and designed to generate current for the electric lighting of premises, or for furnishing the power for heating electric irons, or for operating electric motors designed to run various kinds of machinery and appliances, or for charging storage batteries, or for utilizing the current generated by the horse power for any purpose.

Having thus described my invention what I claim as new and desire to secure by Letters Patent is:—

1. An electrically controlled horse power of the character described, comprising an electric generator and mechanism actuated by the tractive pull of an animal for operating the same; an electric circuit including a circuit closer located at a remote point and a signal in the circuit controlled by said circuit closer, a governor connected to the generator; means controlled by the governor for automatically regulating the movements of the animal which operates said mechanism; and conductors leading from the generator to a distant point.

2. An electrically controlled horse-power, comprising an electric generator; mechanism actuated by the tractive pull of an animal for operating the generator, manually-operated means for giving an audible signal; an electrically-operated whipping mechanism sustained in relation to the animal; and a governor controlled by the tractive pull of the animal and in turn automatically controlling the whipping mechanism.

3. An electrically-controlled horse-power comprising mechanism actuated by the tractive pull of an animal; a manually-controlled electric circuit and signal therein; an electric generator actuated by said mechanism; an electrically-operated whipping mechanism sustained in operative relation to the animal, and a governor controlled by the tractive pull of the animal and in turn controlling the whipping mechanism.

4. An electrically-controlled horse-power comprising mechanism actuated by the tractive pull of an animal; a manually-controlled electric circuit including a signal and a circuit closer at a distant point; an electric generator actuated by said mechanism; an electric circuit and an electrically-actuated whipping mechanism therein sustained in relation to the animal; a governor actuated by the tractive pull of the animal; and a circuit closer controlled by the tractive pull of the animal and in turn controlling the whipping mechanism.

5. An electrically-controlled horse-power comprising mechanism actuated by the tractive pull of an animal; a manually-controlled electric circuit including a signal and a circuit closer at a distant point; an electric generator actuated by said mechanism; an electric circuit and an electrically-actuated whipping mechanism therein sustained in relation to the animal; a governor actuated by the tractive pull of the animal; and a pivoted contact lever controlled by the governor and adapted to close the circuit which includes the whipping mechanism whereby said mechanism is actuated.

6. An electrically-controlled horse-power comprising mechanism actuated by the tractive pull of an animal; a manually-controlled electric circuit including a signal and a circuit closer at a distant point, an electric generator actuated by said mechanism; an electric circuit and an electrically-actuated whipping mechanism therein sustained in relation to the animal; a governor actuated by the tractive pull of the animal; a pivoted contact lever controlled by the governor and adapted to close the circuit which includes the whipping mechanism whereby said mechanism is actuated; and means for varying the strength of the blows imparted by the whipping mechanism.

7. An electrically-controlled horse-power, comprising mechanism actuated by the tractive pull of an animal; a manually-controlled electric circuit including a signal and a circuit closer at a distant point; an electric generator actuated by said mechanism; a main generator circuit; an electric circuit and a whipping mechanism therein sustained in relation to the animal; a governor and circuit closing means controlled thereby for electrically actuating the whipping mechanism; and a circuit controlled by said governor-controlling circuit closing means and including means for reducing the tractive pull of the animal when the same exceeds a certain strength.

8. An electrically-controlled horse-power, comprising an electric generator; mechanism actuated by the tractive pull of an animal for operating the generator; manually-operated means for giving an audible signal; an electrically operated whipping mechanism sustained in relation to the animal; and an electric circuit and manually-controlled circuit-closing means therein operated from a distant point and controlling the whipping mechanism.

In testimony whereof I affix my signature in presence of two witnesses.

ROBERT D. McCREERY.

Witnesses:
T. WALTER FOWLER,
C. W. FOWLER.

Copies of this patent may be obtained for five cents each, by addressing the "Commissioner of Patents, Washington, D. C."